United States Patent [19]

Houston et al.

[11] Patent Number: 5,253,219

[45] Date of Patent: Oct. 12, 1993

[54] HIGH COUNT SEISMIC DATA COLLECTION AND TRANSMISSION THROUGH ANALOG TIME MULTIPLEXING

[75] Inventors: Louis M. Houston; Dennis E. Willen; James A. Rice, all of Houston; Roel Arevalo, Stafford, all of Tex.

[73] Assignee: Exxon Production Research Company, Houston, Tex.

[21] Appl. No.: 465,919

[22] Filed: Jan. 16, 1990

[51] Int. Cl.$^5$ .............................................. G01V 1/22
[52] U.S. Cl. ........................................ 367/79; 367/20; 340/855.3; 340/855.4
[58] Field of Search ........... 340/858, 857, 853, 870.13; 367/79, 20

[56] References Cited

U.S. PATENT DOCUMENTS

| | | | |
|---|---|---|---|
| 2,740,945 | 4/1956 | Howes | 340/15 |
| 3,050,151 | 8/1962 | Vogel | 181/0.5 |
| 3,264,606 | 8/1966 | Crook et al. | 340/15.5 |
| 3,652,979 | 3/1972 | Angelle | 367/79 |
| 3,707,700 | 12/1972 | Lafont | 340/18 |
| 3,725,857 | 4/1973 | Pitts, Jr. | 340/858 |
| 3,959,767 | 5/1976 | Smither et al. | 340/18 |
| 4,023,140 | 5/1977 | Siems et al. | 367/79 |
| 4,415,895 | 11/1983 | Flagg | 340/856 |
| 4,464,739 | 8/1984 | Moorcroft | 367/20 |
| 4,509,170 | 4/1985 | Hollinger et al. | 367/79 |
| 4,545,039 | 10/1985 | Savit | 367/39 |
| 4,562,557 | 12/1985 | Parks et al. | 367/27 |
| 4,568,932 | 2/1986 | Flagg | 340/853 |
| 4,639,729 | 1/1987 | Savit | 367/79 |
| 4,684,947 | 8/1987 | Zimmer | 340/858 |
| 4,787,069 | 11/1988 | Beauducel et al. | 367/79 |
| 4,901,289 | 12/1990 | Cretin et al. | 340/858 |

FOREIGN PATENT DOCUMENTS 2613496  10/1988  France .
2616230  12/1988  France .

OTHER PUBLICATIONS

B. J. Thorne & H. E. Morris—"An Assessment of Borehole Seismic Fracture Diagnostics"—1988—SPE 18193.

E. I. Gal'perin—"Vertical Seismic Profiling"—1971—pp. 22-23.

Brochure—"Multilock Multilevel Digital VSP System"—GCC Association.

Brochure—"Downhole Seismic Array"—Schlumberger.

*Primary Examiner*—Ian J. Lobo
*Attorney, Agent, or Firm*—Vaden, Eickenroht, Thompson, Boulware & Feather

[57] ABSTRACT

A data collection and transmission system for gathering high count vertical seismic data is disclosed using a sequence of vertically aligned seismic receivers, the analog outputs from which are sequentially analog sampled and time multiplexed onto a common pair of data conductors in the support and transmission cable. The data is time demultiplexed at the surface and appears substantially as digital data because of the relatively short sampling times. Such data is converted into analog data with conventional digital-to-analog converter means.

A clock signal activates counters for establishing non-overlapping data gates in the respective sondes, the operation of the gates supplying the cable with the respective receiver analog signals in a sequence from bottom to top, simultaneously switching off previously gated signals until a clock reset pulse resets the entire sonde string.

Borehole engaging means are locally powered at each sonde and are controlled for engagement and disengagement from above using appropriate control signals therefor. The appropriate coupling by the engagement means at each sonde is monitored by examining the change in motor voltage reflected on the data lines. Alternatively, a shaker may be employed for generating geophone receiver signals for comparison purposes with an appropriate standard.

31 Claims, 8 Drawing Sheets

ACTUAL TIME GATE ≤ 50µS

HIGH COUNT SEISMIC DATA COLLECTION AND TRANSMISSION THROUGH ANALOG TIME MULTIPLEXING

BACKGROUND OF THE INVENTION

1. Field Of The Invention

This invention pertains to the collection of seismic data and more specifically to high channel count collection and transmission of such data in an efficient manner.

2. Description Of The Prior Art

The importance of vertical seismic profiling and the obtaining of cross borehole data makes it imperative that the data collection and transmission technique be as efficient as possible to provide the maximum amount of data in the minimum amount of collection time. One of the main reasons for this is that the borehole being used for the collection of such data is taken out of service or production, similar to the situation when providing well-logging service to the well.

The economics of vertical seismic profiling ("VSP") and cross borehole recording would be more attractive if the amount of time needed to record data could be reduced. Companies who record VSP data charge several tens of thousands of dollars for their service, and these service charges are roughly proportional to the amount of time needed to record the data. More importantly, if data are recorded while a drill rig is still on site, then drill rig standby charges must also be paid.

In conventional vertical seismic profiling or cross borehole recording, a seismic source is located external to the borehole where the profiling data is to be gathered, usually being positioned on the surface or in another borehole. A receiver is located in the borehole to receive the seismic data signals. The received pulses are each converted by a suitable transducer to an analog signal and either transmitted in that form or in digital form to the surface for storage. The receiver is then elevated to another vertical location and the procedure is repeated.

One effective way to reduce VSP field recording time is to record data at more than one depth for each seismic shot. Recording VSP data at even two or three depth levels simultaneously would result in an appreciable reduction of recording time over that now required to collect data with current single-point recording systems. However, it is not readily apparent from such observation how to implement the collection of data, its handling and treatment, and the transmission thereof in an efficient and simple manner within the physical constraints found in a downhole environment.

Multi-level VSP receiver systems have been used in the Soviet Union for several years. A discussion of these Gal'perin, a translated publication of the Society of Exploration Geophysicists, copyright 1974, as Special Publication No. 12. The primary techniques used to transmit data in these systems described in this publication have been amplitude and pulse-width modulation. Each receiver's signal modulates the amplitude or width of a high frequency (approximately one kilohertz) carrier that is on the data lines at all times. The carrier frequency is different for each receiver. At the surface, the carriers are isolated and the signals recovered by conventional methods. The electronics required for this technique are far from trivial. The limiting factor is crosstalk in the wireline; that is, the number of different carrier frequencies which the cable can sustain without mixing the individual signals. Devices with up to twelve channels have been reported in the literature.

A similar method for recording multi-level VSP data was recently developed at Sandia National Laboratories. The seismic signals from eight downhole receivers are frequency division multiplexed onto frequency modulation subcarriers for transmission to the surface through a single conductor wireline. Again, the electronics of this system is not simple and the number of channels is limited by crosstalk.

The most popular acquisition method currently used for multi-level VSP is downhole digitizing. Downhole digitizing places separate analog-to-digital converters and memory on each of several receiver sondes. A sonde may handle data from one or from a few receivers. After a shot, the sondes are polled and transmit their digitized data uphole sequentially, using only two conductors. This technique uses relatively expensive and complicated electronics which can be quite sensitive to the borehole temperature. CGG American Services, Inc. offers this service (Multilock) with a maximum of four sondes comprising twelve channels of vertical receivers. Schlumberger Well Services is also marketing a system (Downhole Seismic Array) with eight channels.

There are also superficial similarities in VSP and well-logging that warrants a review of the possible applicability of well-logging apparatus as VSP apparatus or in VSP procedures. There are some instances in the well-logging prior art, for example, of the use of multiple acoustical receivers, where the typical acoustical well-logging frequencies are on the order of 5-25 KHz. Such frequencies are much higher than the 20-200 Hz frequencies used in seismic profiling. Nevertheless, as is shown for example in U.S. Pat. No. 4,684,947, Zimmer, a tool is disclosed having an acoustic transmitter and four receivers, one above the other, in a common sonde with a transmitter. The return pulses are received, converted to analog signals, multiplexed, converted to digital form and then transmitted to the surface for recording and later processing. There are many other examples in the well-logging literature using multiple receivers and utilizing similar electronics for polling the receivers and digitizing the data for uphole transmission using the two conductors in a typical sevenconductor cable that are normally available for data transmission purposes.

It is well-known that the industry standard logging cable includes seven conductors. Since two of the conductors are used for power, one is used for ground, and two are used for control lines, all data must be transmitted on the two remaining conductors. It is possible when there is only one receiver to transmit the received signals in their analog condition are as described above; however, when multiple receivers are used, digital conversion has been commonly employed, such as in the embodiment shown in the '947 patent, because of the constraints of the cable transmission bandwidth.

Although the multiplexing and digitizing electronics that have been employed with the higher frequencies used with acoustic well-logging are satisfactory in such application, such electronics are subjected to high temperatures and often result in data warp that is unacceptable at the frequencies employed in seismic profiling, i.e., in the range between 20-200 Hz.

Returning to prior art VSP apparatus, it should be noted that in land based exploration the individual VSP geophones that are employed are housed in sondes, which are positioned in the well borehole by suspending them from the logging cable at the desired depth and then clamping them to the borehole wall. Most current sondes are designed to clamp to the borehole wall by means of a single motor or hydraulically driven arm mechanism that extends from one side of the body of the sonde to one side of the well bore, thereby forcing the body of the sonde against the opposite side of the well bore. The VSP geophone is effectively coupled to the well bore by a single force in this manner. Another common technique that is employed is to clamp the sonde to the borehole wall with powerful electromagnets. This technique is limited in application, however, to wells with boreholes lined with metal casing.

Clamping the geophone to the borehole wall allows the logging cable, by which the geophone is suspended, to be slackened so that it no longer supports the weight of the geophone and thereby instantly removes one major transmission path for extraneous noise known as cable waves. The degree of clamping to the borehole wall is an important factor if the geophone response is to be without distortion and proportional to the small amounts of particle displacement of the rock surrounding the borehole. There must be no differential movement, i.e., slippage, between geophone and wall during passage of the seismic event; this means in practice that for a mechanically coupled sonde a lateral force equivalent to about two or three times the weight of the geophone must be supplied by the arm mechanism. Typical VSP tools weigh about 150 pounds. This implies a locking mechanism capable of delivering about 200 to 300 pounds of lateral force if reasonable coupling is to be achieved.

Therefore, it is a feature of the present invention to provide improved vertical data collection apparatus that allows high channel count collection and fast data transmission using two-wire cable conduction.

It is another feature of the present invention to provide improved data collection and transmission wherein the transmission of the detected analog signals is compartmentalized in a time multiplexing sequence, thereby allowing any required digitizing to be performed at the surface and avoiding performing digitizing operations downhole in the geophones or below the surface in hydrophones.

It is another feature of the present invention to provide distributed time multiplexing of received seismic signals at a plurality of receivers vertically aligned in a borehole, wherein the overall pulse period of the transmitted seismic pulse is on the order of about 20 milliseconds, and wherein the total multiplexing period is only on the order of about 15 microseconds, thereby providing sampling of the received seismic pulse on the order of over 1000 times each pulse period to thereby make the data information of an overall seismic pulse received at each receiver of high fidelity to the actual received pulse.

It is still another feature of the invention to provide distributed time multiplexing of received seismic signals compatible for use with downhole digitizers while not requiring such digitizers.

It is also a feature of this invention that the downhole technique of time-multiplexing of analog signals can be adapted for use with hydrophones in an aquatic environment or for use with geophones distributed on the surface.

It is yet another feature of the present invention to provide improved coupling of an electronic receiving apparatus to the well bore so as to provide suitable geophone reception of seismic signals, such as are used in VSP.

SUMMARY OF THE INVENTION

The invention disclosed and claimed herein pertains to a method of vertical seismic profile or cross borehole data collection and transmission and to an apparatus suitable therefor. In a preferred embodiment of the apparatus, a plurality of suitable geophones or other seismic receivers are vertically aligned and suspended in a borehole supported by a conventional logging cable. A conventional logging cable has two conductors available for data transmission. Externally generated seismic pulses are received by the receivers and converted to individual electrical analog signals. An overall seismic pulse period is typically on the order of about 20 milliseconds long. A common clock controller connected to the receivers provides a simultaneous reset timing pulse to a counter located with each receiver. Each counter counts successive timing pulses from the clock controller and enables its associated receiver, during a time window or a subperiod of time of the overall seismic pulse, to supply its detected analog signal during that time window to the pair of data conductors in the support cable. Each counter is set to provide its receiver with a different non-overlapping time window, thereby effectively time multiplexing the respectively sampled analog signals from the respective receivers. When a receiver is enabled, all of the vertically lower receivers are disabled until another reset pulse occurs. By providing sampling to occur every 15 microseconds for a subperiod of approximately 3 microseconds, and assuming four receivers, each receiver is enabled to provide over 1000 samples for a pulse period of 20 milliseconds previously mentioned. The associated demultiplexing of the analog transmissions, digitizing and recording equipment is located at the surface, thereby avoiding subjecting such equipment to the adverse conditions of extreme temperatures and pressures usually prevalent in a downhole environment.

Some types of geophones generate three separate signals, one for each of the three orthogonal axes, each time a seismic pulse is detected. Therefore, for receivers equipped with such geophones, time multiplexing each of the three resulting signals separately for each geophone is accomplished before the subsequent geophone signals are multiplexed. Thus, it is possible to analog time multiple all of the information, still using only two data transmission conductors in the support cable. Because this distributed analog multiplexing eliminates the need for wiring all the sondes to a central multiplexer, it allows greater flexibility in the number of sondes which may be deployed.

A borehole engagement means, or wall locking apparatus, for use with geophone containing sondes employs a motor driven, multi-arm, scissor jack and is activated by self-contained batteries associated with each receiver sonde, thereby avoiding the transmission of high currents from the uphole wireline and employing less complex activating and latching structures than are usually associated with oil tools operated in such manner. The tool is based on the "scissor" jack, which is normally used to manually lift cars for tire changes. The scissor jack VSP tool modifies the scissor jack by changing the driving mechanism from a manual crank to an electric motor and adding one or more pairs of "scissor" lever arm pairs depending on the stability needed. For vertical stability, the tool consists of two pairs of scissor lever arms azimuthally separated by 180 degrees. For vertical and horizontal stability, the tool consists of three pairs of scissor lever arms azimuthally separated by 120 degrees.

There also is a means provided for detecting whether each sonde is properly coupled with the borehole using the data transmission channels for receiving the waveforms from the motor activating the jack to determine if the sonde is secured in place.

Finally, the technique of time-multiplexing analog signals from seismic receivers is adaptable to other seismic exploration techniques. One such technique is the use of geophones distributed in a predetermined pattern on the ground surface rather than in a borehole. Another such technique involves the use of hydrophones in a streamer cable for marine exploration. Embodiments employing each technique with this invention are also disclosed herein.

BRIEF DESCRIPTION OF DRAWINGS

So that the manner in which the above-recited features, advantages and objects of the invention, as well as others which will become apparent, are attained and can be understood in detail, more particularly description of the invention briefly summarized above may be had by reference to the embodiments thereof that are illustrated in the drawings, which drawings form a part of the specification. It is to be noted, however, that the appended drawings illustrate only preferred embodiments of the invention and are, therefore, not be considered limiting of its scope for the invention may admit to other equally effective embodiments.

IN THE DRAWINGS

Figure 1:
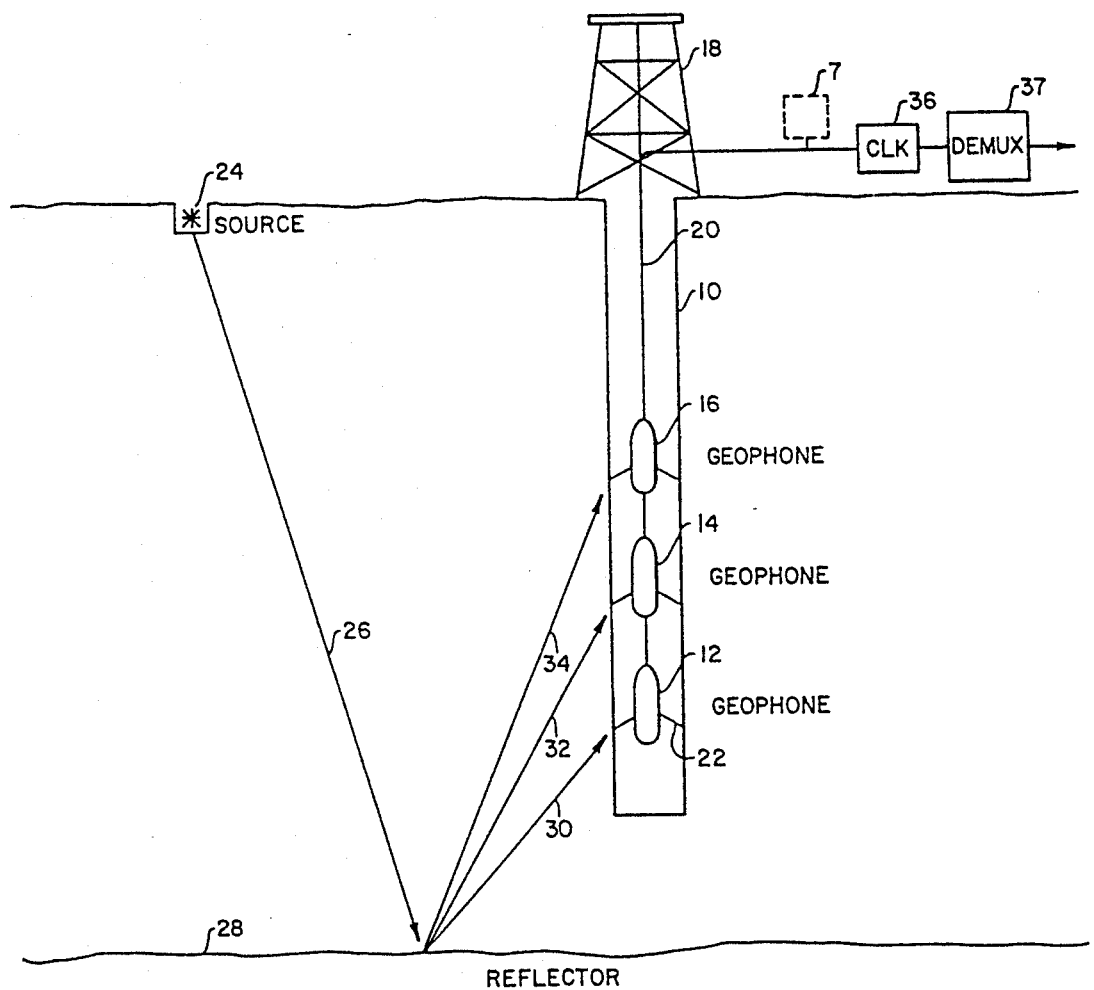

FIG. 1 is a schematic representation of a high count vertical seismic data collection and transmission apparatus in accordance with the present invention.

Figure 2:
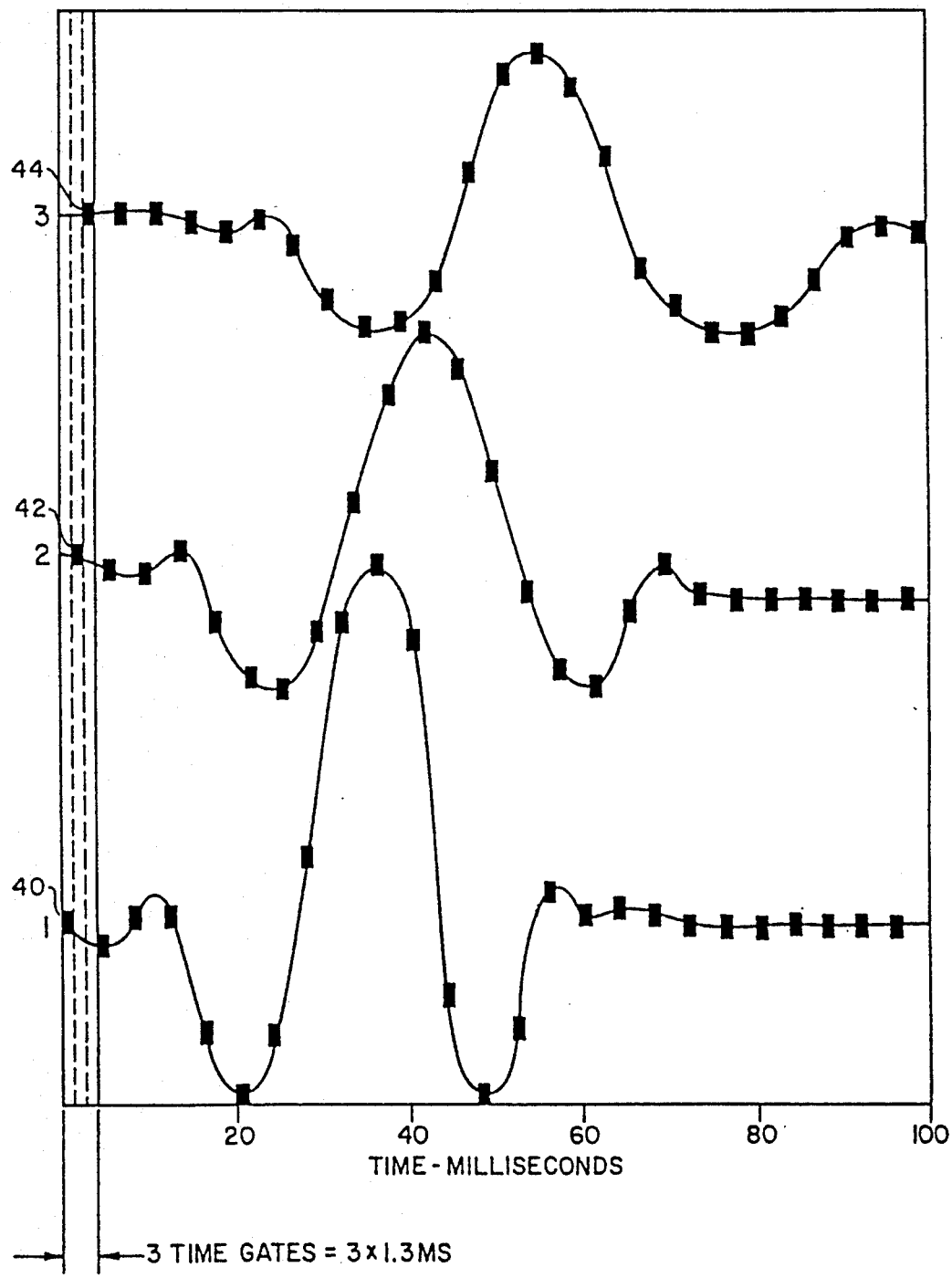

FIG. 2 is a waveform diagram of three analog signals from the geophone receivers shown in FIG. 1, also showing the time gating of the signals in accordance with the invention.

Figure 3:
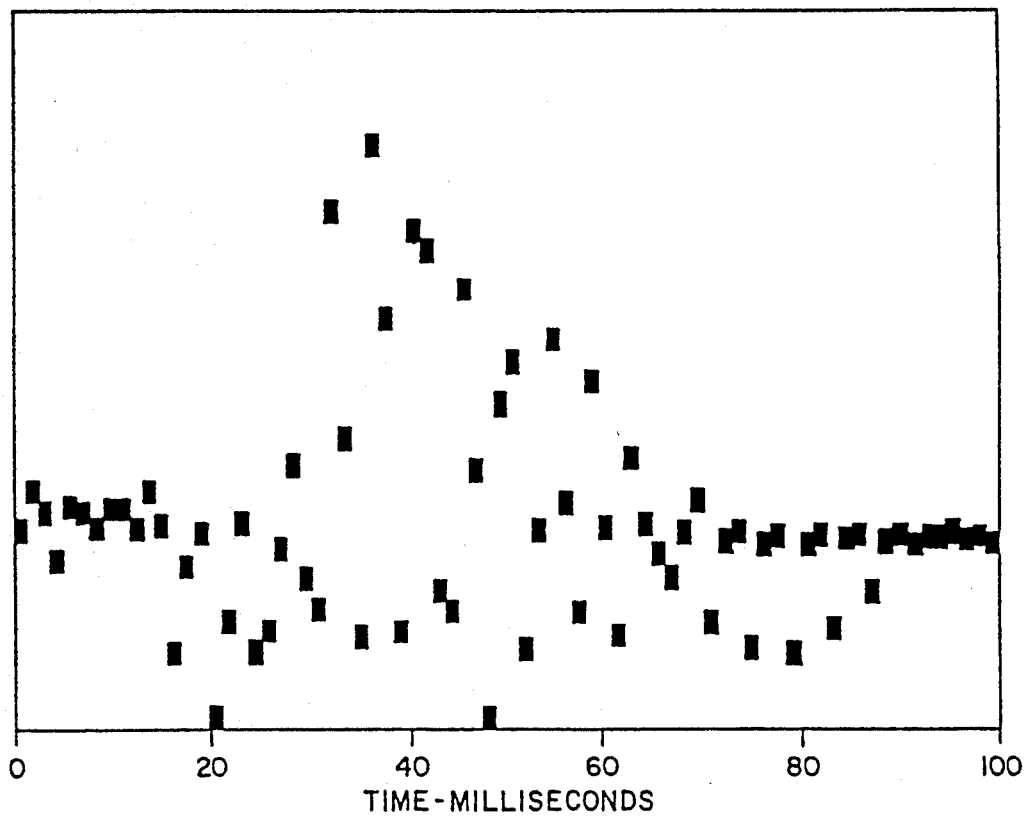

FIG. 3 is a waveform diagram of the sampled signals shown in FIG. 2 as they arrive up hole.

Figure 4:
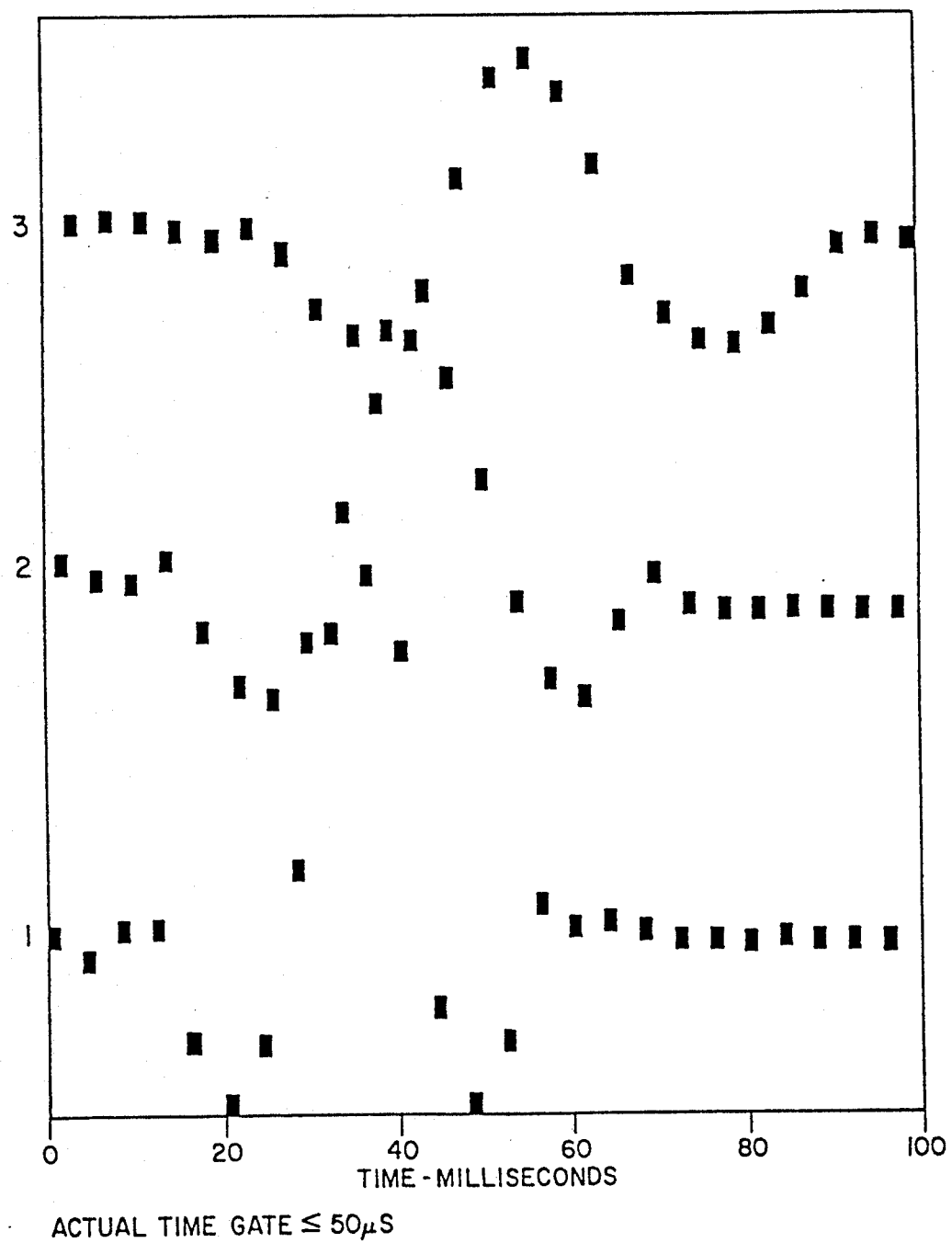

FIG. 4 is a diagram of demultiplexing the signals shown in FIG. 3.

Figure 5:
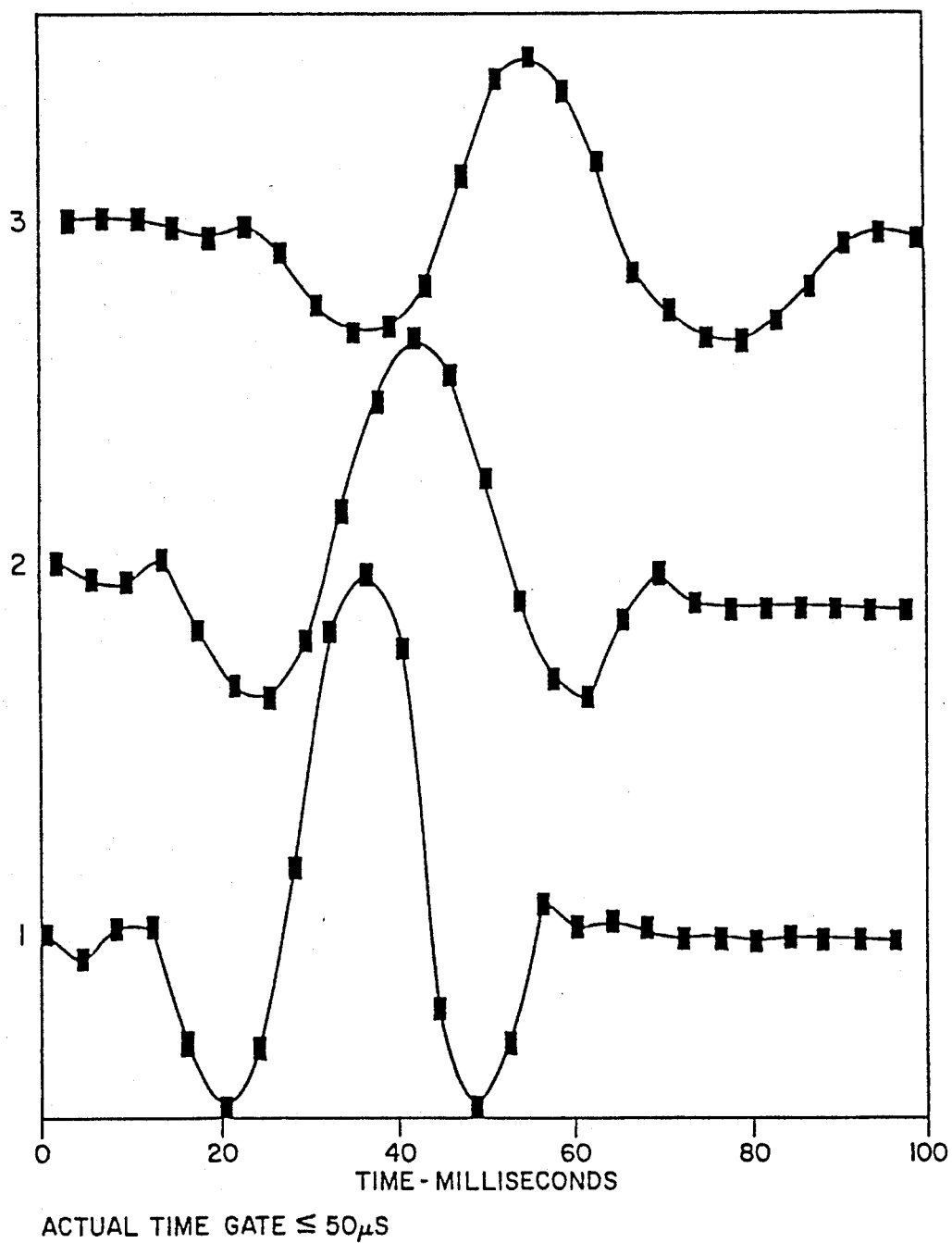

FIG. 5 is a waveform diagram showing reconstruction of the analog signals from the sampled signals shown in FIG. 4.

Figure 6:
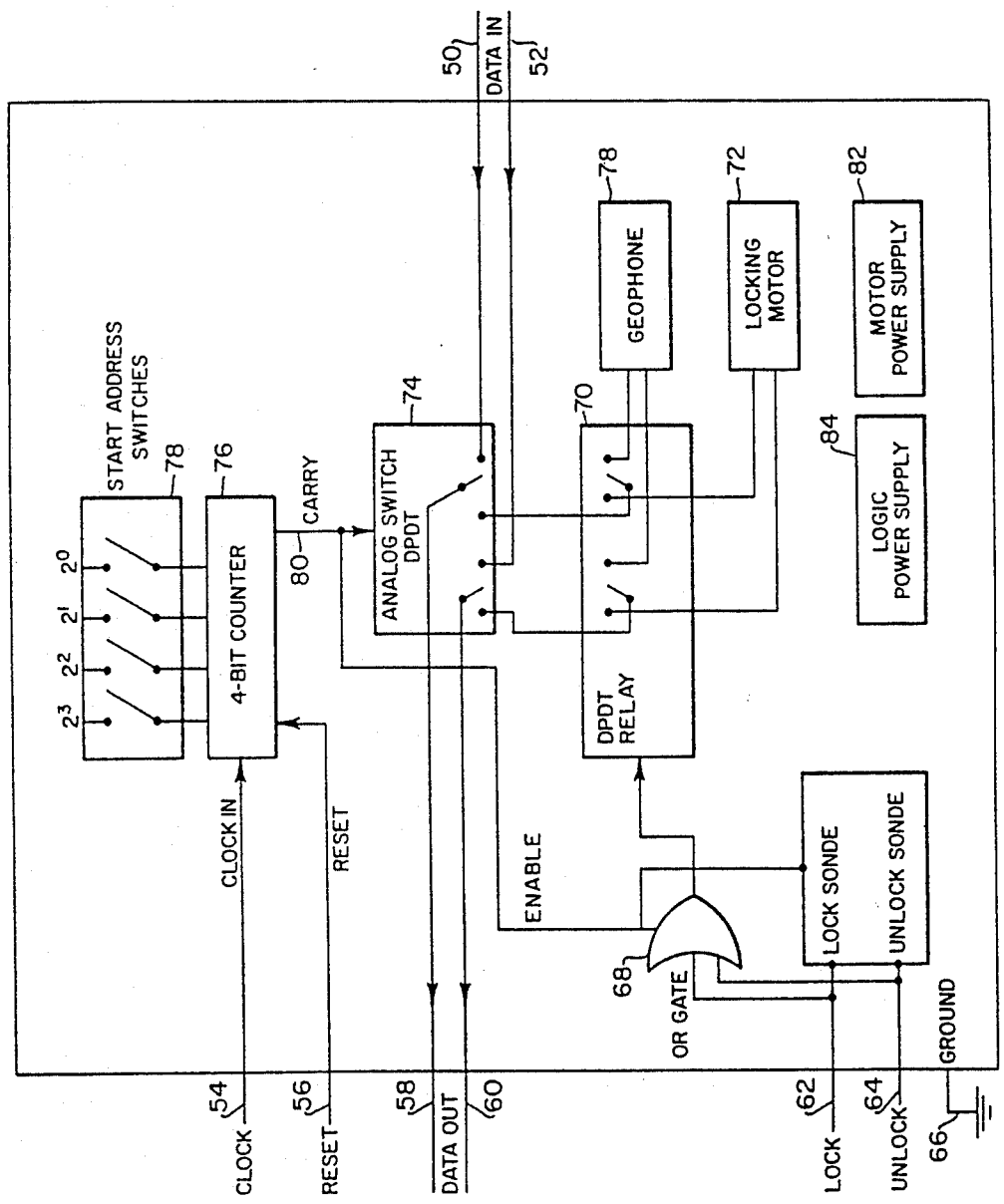

FIG. 6 is a block diagram of the data collection and transmission electrical components of a preferred embodiment of a receiver sonde in accordance with the present invention.

Figure 7B:
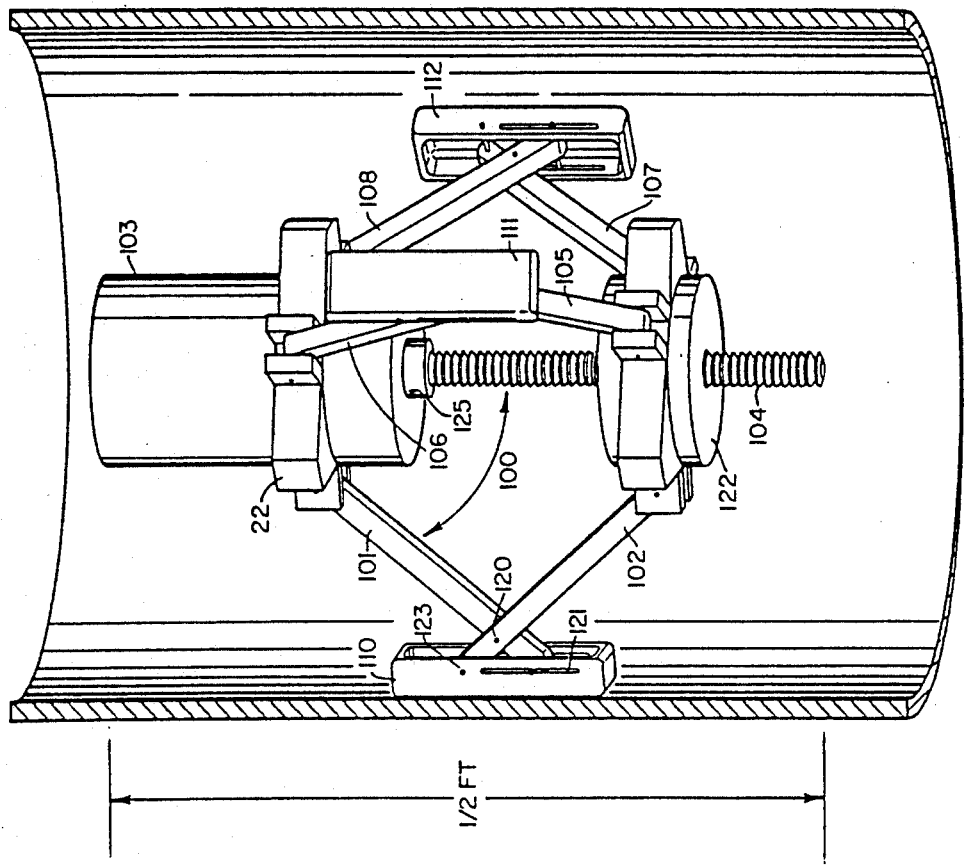
Figure 7A:
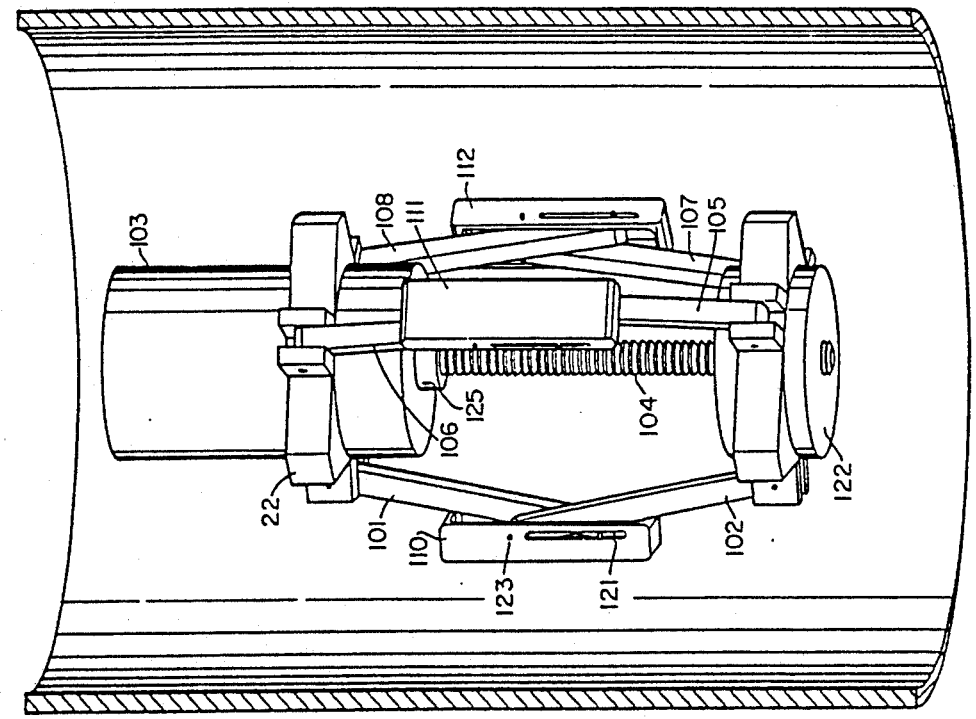

FIG. 7a illustrates a three-pair, six legged configuration of the wall locking apparatus in an unclamped state.

FIG. 7b illustrates the configuration of FIG. 7a in a clamped state.

Figure 8:
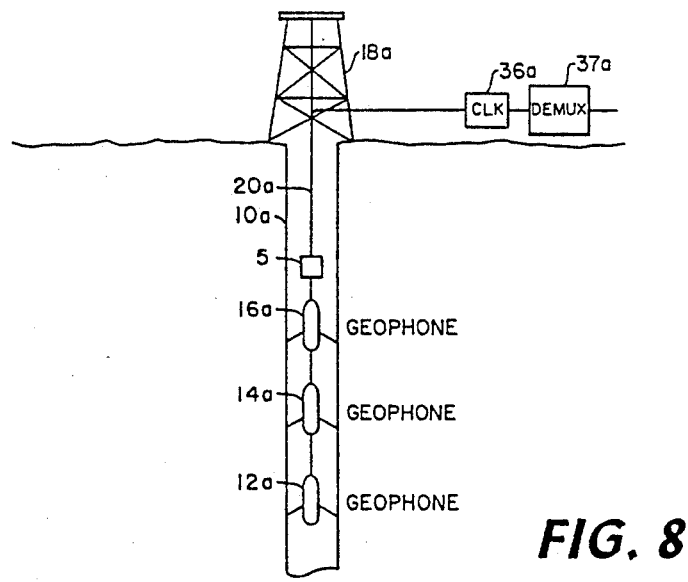

FIG. 8 discloses an alternative embodiment wherein the invention is practiced in conjunction with downhole digitizing.

Figure 9:
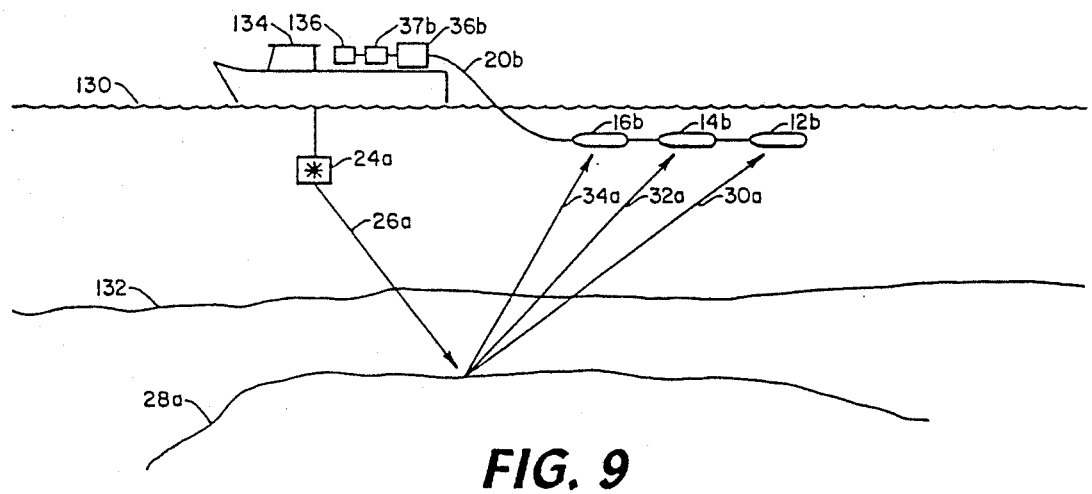

FIG. 9 depicts an alternative embodiment of the invention adapted for use in marine environments.

Figure 10:
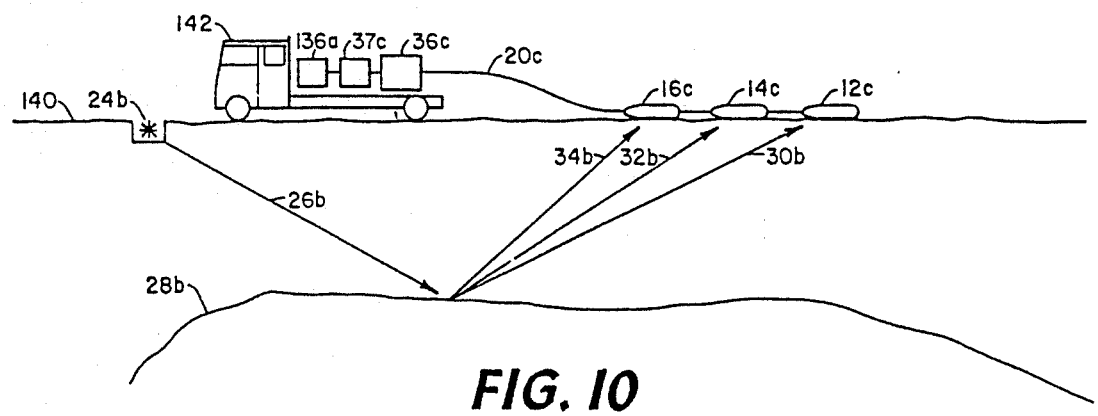

FIG. 10 depicts an alternative embodiment of the invention wherein the receivers are distributed along to surface of the ground.

DESCRIPTION OF THE PREFERRED EMBODIMENTS

Now referring to the drawings, and first to FIG. 1, a schematic representation of a borehole 10 is shown in which there are a plurality of geophone receivers 12, 14 and 16 vertically aligned at regular intervals. In actual practice, each geophone receiver is located within its own sonde with its own associated components, as herein more fully described. It is also possible to adapt the invention hereafter disclosed for use in marine environments by using hydrophones in streamer cables rather than sondes suspended from a logging cable. Such sondes are interchangeable and replaceable as a unit or module, for convenience. The receivers are serially supported from suitable wellhead apparatus (not shown) by a suitable support and signal transmission cable 20, which most conveniently is a standard 7-conductor logging cable, each lower positioned receiver being electrically connected through electrical connections, as hereafter explained, through the receiver sonde above it until all are connected to cable 20 leading to the surface. Each receiver sonde includes suitable coupling components 22, more fully explained below, for allowing the receiver therein to be acoustically coupled to the borehole.

A source 24 located outside the borehole, produces a seismic signal 26 toward a reflecting geologic interface 28, and results in reflected signals 30, 32, and 34, respectively, to be received by receivers 12, 14, and 16. Because the path lengths of signals 30, 32, and 34 are progressively longer, it is apparent that the time of receipt of these signals at the respective receivers are progressively later. The data obtained from signals 30, 32, and 34 by receivers 12, 14, and 16 is then time multiplexed in a manner to be described hereinafter and sent to the surface where it is demultiplexed by demultiplexing circuit 37. The embodiment of demultiplexing circuit 37 can be any one of a number that are commonly known in the art and may be implemented in hardware, software, or a combination in varying amounts of both. A common clock 36 provides timing and control for both the downhole signal processing and the surface handling of the data. The embodiment of common or control clock 36 can also be any one of a number well known in the art and will vary according to constraints such as components employed and sampling rates desired.

Now referring to FIG. 2, typical waveform diagrams of the seismic signals received at geophone receivers 12, 14, and 16 are shown. Signal 1 is the seismic signal received by receiver 12; signal 2 is the seismic signal received by receiver 14; and signal 3 is the seismic signal received by receiver 16. Each is an analog signal which has an impulse duration of about 100 milliseconds. For the three receivers of this proposed configuration, the overall period shown is 100 milliseconds, a duration long enough to have received all of the pulse information from all three receivers resulting from the reflections of a single stimulating source impulse from source 24.

FIG. 2 illustrates a complete sampling subperiod of all three waveforms every 4 milliseconds, or a resulting sampling of each of the three waveforms 25 times for the 100 millisecond period illustrated. In actual practice, the sampling subperiod may be much shorter and the sampling occurrence much more frequent. Preferred sampling subperiods of from about 5–50 microseconds have been employed. However, returning to the sampling rate shown in FIG. 2, each sampling subperiod is divided into three gate or window periods, one gate period for sampling each of the three respective receiver signals of 1.3 milliseconds. There is then a 0.1 millisecond recovery or reset period for purposes of resetting the electronic components for sampling during the next sampling subperiod, as hereafter explained. Thus, during the first gate or window period 40, signal 1 from receiver 12 is sampled, followed successively by the sampling of signal 2 from receiver 14 during gate or window period 42 and by the sampling of signal 3 from receiver 16 during gate or window period 44. Thereafter, following reset, signal 1, then signal 2 and finally signal 3 are again sampled in the same manner. This procedure continues until all gate or window subperiods have been sampled for the entire receiver impulse period or duration of 100 milliseconds depicted.

FIG. 3 illustrates the entire collection of sampled data. It can be seen that the sampled data is effectively a collection of points, although actually each point is really a segment of analog data occurring during each respective gate or window period for the signal being sampled. Because the duration of the gate is short with respect to an entire analog impulse, the information contained within the analog signals is accurately captured by the representation of FIG. 3. It can also be seen from FIG. 3 that the sampled data for signals are interspersed in the sampling sequence. That is, for the example of three geophone receivers, every third data sample relates to the same analog signal. The uphole processing apparatus shown in FIG. 1 includes the necessary time demultiplexing components 37 to separate the data from the three signals for separate display, as shown in FIG. 4, or for analysis. The original analog impulses are readily reconstructed by joining the FIG. 4 data points, as shown in FIG. 5.

This invention of time-multiplexing analog signals is adaptable to other seismic surveying techniques. One alternative embodiment applies time-multiplexing to analog signals received by hydrophones. The use of hydrophones in a streamer cable towed by a towing vessel in aquatic exploration is well know in the art. Hydrophones operate basically the same as geophones, the differences primarily pertaining to environmental isolation. Adaptation of this invention for use in aquatic environments will subsequently be disclosed herein as will an embodiment of the invention where geophones are distributed on the ground surface rather than in a borehole, another seismic surveying technique well known to those reasonable skilled in the art. While the preferred embodiment eschews downhole digitizing the technique is nevertheless compatible with this invention. As noted earlier, digitizing techniques are well known in the art, and the adaptation necessary to practice this invention in such a manner is disclosed in the discussion of the embodiment depicted in FIG. 8.

The clamping component 22 of FIG. 1 as more fully depicted in FIGS. 7a and 7b is a lightweight mechanism which utilizes a motor driven, multi-armed, scissor jack for use with geophones. Clamping component 22 is only useful for embodiments wherein receivers are deployed in a borehole, since no clamping occurs when geophones are distributed on the surface or when hydrophones are towed through water. Typically, a scissor jack is comprised of a crank which drives a lead screw with its screw pivoted to the end of a lever and its nut pivoted to the end of another lever. The two levers are attached at a common pivot point to form a "scissor". The location of this common pivot point determines the lever-arm advantage. The force augmentation of a scissor jack is done in three stages:

Stage 1 involves the crank to lead screw force conversion. This is simply determined by the length of the crank, which is a moment arm.

Stage 2 involves the lead screw rotational to linear force conversion. This is determined by the pitch and radius of the screw.

Stage 3 involves the lever arm advantage of the scissor configuration. The net result is an extremely high force augmentation.

The geometry of the tool incorporates either two pairs of opposing lever arms azimuthally separated by 180 degrees, or three pairs of opposing lever arms azimuthally separated by 120 degrees. FIG. 7a illustrates the three-pair, six-armed configuration in an unclamped state and FIG. 7b shows the same configuration in a clamped state. Note that in the configuration in FIGS. 7a and 7b the lever arms 101, 106, and 108 are horizontally spaced around the circumference of the sonde body 103, i.e., 120 degrees apart, as are the lower arms 102, 105, and 107.

Although a two armed configuration is workable, the four-armed configuration is the practical minimum necessary for vertical stability, whereas the six-armed configuration is the practical minimum necessary for both vertical and horizontal stability. If the component of seismic motion recorded is only along the vertical axis of the borehole, as for normal single receiver VSP tools, the four-armed mechanism is adequate. The six-armed mechanism would be necessary for recording quality multiple-component data. In contrast to most VSP clamping tools, the scissor jack is multi-armed and has a configuration which, due to the lever arm ratio, augments its locking force. This reduces the complexity and power of equipment needed to generate large locking forces.

Each of the scissor jacks comprising the coupling component 22 is identical in construction and therefore the construction of only a single scissor jack is discussed. It is to be understood, however, that the discussion applies to as many scissor jacks as the user wishes to employ for any given sonde arranged as discussed above. The scissor jack is comprised of lever arms 101 and 102, which are pivotally connected at pivot point 120 (shown in FIG. 7b, but not FIG. 7a). One end of lever arm 101 is pivotally connected to sonde body 103 housing the jack motor (not shown), while the other end is connected to engaging member 110 so that it slides along groove 121 as the jack is raised and lowered. As illustrated in FIG. 7b by engaging member 112, each engaging member has two grooves, one on each, opposite side. Engaging member 110 consequently has a groove opposite groove 121 which is not pictured, but to which the end of lever arm 101 is also pivotally connected in like manner. One end of lever arm 102 is pivotally connected to the threaded member 122 while the other end is pivotally connected to engaging member 110 at pivot point 123.

Threaded member 122 is connected to the jack motor (not shown) housed in the sonde body 103 via screw post 104, which is oppositely threaded at either end so that when the jack motor turns screw post 104 in response to a lock signal from the surface, threaded member 122 is drawn toward sonde body 103. This action causes the pivotally connected lever arms 101 and 102 to extend away from the sonde body 103, thereby raising engaging member 110 so that it contacts the borehole wall. Conversely, when the jack motor turns screw post 104 in response to an unlock signal from the surface, threaded member 122 is pushed away from sonde body 103 thereby causing pivotally connected lever arms 101 and 102 to lower the engaging means 110 and break the borehole coupling.

Power for the jack motor is provided by a battery which is housed in sonde body 103 similarly to the jack motor. Reference to FIG. 6 will show that the motor power supply is separate from the logic supply. The downhole power supply provides greater current than would a surface power supply and enables the use of smaller, more powerful motors. This in turn yields strong coupling forces.

The clamping component 22 also has a failsafe control in the event of failure during use in the clamped state in order to prevent borehole blockage during VSP operations. The clamping component 22 has a shear pin 125 as is shown in FIGS. 7a and 7b. Shear pin 125 protrudes through sonde body 103 thereby interacting with threaded screw 104. The strength of shear pin 125 is determined at the surface before VSP operations begin. In the event of equipment failure when it is time to unlock clamping component 22, the operators need only exert an upward force on the 7-conductor logging cable (not pictured) greater than the clamping force being exerted by clamping component 22. This will cause shear pin 125 to break and thereby allow screw post 104 to slide freely so that the lever arms 101-102, and 105-108 collapse and break the coupling.

Now referring to FIG. 6, a block diagram of the electronic components included in a geophone receiver sonde are shown. The sonde includes seven connections to the logging cable conductors connected from above and two connections for receiving data input from below. The two data input lines are identified by reference numbers 50 and 52 and the seven connections leading to the cable are clock line 54, reset line 56, data output lines 58 and 60, clock control line 62, unlock control line 64, and ground 66.

The latching or locking mechanism located at each sonde is initiated by a lock control signal being applied to lock line 62 from above. Such a signal enables OR gate 68 and applies a signal through this gate to activate double-pole, double-throw relay switch 70 to activate locking motor 72. It is necessary that a sonde be in a physical coupling relationship with the borehole for the geophone receiver in the sonde to properly operate.

Each sonde is equipped with a plurality of motorized scissor jacks as a borehole engagement means, whose operation has already been discussed, for this purpose. The wall-locking mechanism located at each sonde is first enabled by having the clock controller 36 (in FIG. 1) reset on line 56 and increment on line 54 each sonde's counter 76 until the first sonde's counter 76 has reached its maximum count (in this case, fifteen). At this point, a carry signal is output from the counter onto line 80 and the incoming clock pulses on line 54 are halted. Since each sonde's counter 76 is preset to a different initial starting address by start address switches 78, each sonde's counter 76 will output a carry subsequent to the one above it, but prior to the one below. The carry signal on line 80 activates the analog switch 74 and enables both wall-locking motor 72 and OR gate 68.

The first sonde's wall-locking mechanism can now be controlled through the lock control line 62 and unlock control line 64. The lock signal is conventionally applied to the locking motor on line 62, the operation of which can be detected at the surface by reading the value of the data output lines 58 and 60. This is due to the OR gate 68, which outputs a pulse when a lock or unlock signal is applied and consequently turns on DPDT (Double-Pole-Double-Throw) relay 70. This relay interchanges the geophone signal for the motor voltage, which can then be read on data lines 58 and 60. When the mechanism locks, the motor current rises and its positive voltage drops. By observing this voltage drop on data lines 58 and 60, the locking status can be confirmed. Likewise, an unlock signal on line 64 reverses the motor housing the sonde body 103 and releases the locking mechanism. This can again be confirmed by observing a negative voltage rise on the data lines 58 and 60 corresponding to the changing motor voltage as it reverses direction.

Following the locking operation, lock signal on line 62 is removed, thereby allowing relay 70 to connect geophone 78 to data output lines 58 and 60 through switch 74. By observing and comparing the output signal appearing on the data output lines 58 and 60, it is thus possible to affirmatively determine that the sonde is or is not properly coupled in place. This process is repeated for each sonde suspended in the borehole. Because each sonde's counter will output a carry after the one above it and before the one below it, the signals from the various sondes can be distinguished by their respective appearances in their predetermined window subperiods, as was more fully explained with data acquisition.

Alternatively, a shaker means 7 (in FIG. 1) as is well known in the art may be employed to test the coupling of the sondes to the borehole. An evaluation of whether the sondes are adequately coupled is made by comparing the signals obtained with predetermined standards. If coupling is not shown to be proper, another lock attempt can be made. However, if further attempts are unsuccessful, then it will be necessary to either replace the sonde or to ignore the data output therefrom as being defective.

Assuming that the sonde is properly physically coupled to the borehole, data acquisition or collection can now be initiated. A reset signal from a common clock controller (see clock 36 in FIG. 1) attached to the cable in the form of a very short rectangular pulse is applied on reset line 56 followed by the initiation of a clock pulse from the same controller 36 on line 54. Such pulse will start 4-bit counter 76 operating and at the appropriate time, as determined by the preset address switches 78 connected to counter 76, will produce an output from the counter on carry line 80. This output on carry line 80 must be held until a new reset signal is received from the common clock controller (clock 36 in FIG. 1). Consequently, it may be the carry output for the required period. The predetermined address set by address switches 78 will determine the time window or subperiod of time that the signal from this sonde as generated by its geophone receiver 78 is gated onto data output lines 58 and 60. During this preset subperiod of time, switch 74 is activated to connect geophone 78 to lines 58 and 60. Prior to that time, data input lines 50 and 52 were connected through switch 74 to the data output lines. Thus, not only is the output of geophone 78 placed onto output lines 58 and 60, the data arriving from below is disconnected by the same switching action, thereby accomplishing the desired time multiplexing, as previously described in the above discussion of FIGS. 1 through 5.

When the entire sequence of sondes has been selected in the manner just described, another reset pulse is imparted on line 56 to reset the counter and to cause switch 74 to reset to receive data from below rather than from geophone 78, as before.

After the entire sequence of acquisition and transmission of data has been accomplished, an unlock control signal is applied to line 64 from the surface that reverses the operation of the locking motor housed in sonde body 103 to unlock or unlatch the sonde for removal or for positioning at a new location.

It may be seen from FIG. 6 that motor power supply 82 and logic power supply 84 are separate power supplies for two reasons. First, power supply 82 is typically a 12-volt supply and generates a relatively large current for operating the locking motor, whereas logic power supply 34 is typically a 5-volt supply with small current requirements for operating the logic circuit components. Second, it is desirable to keep the power supplies isolated from each other to prevent possible inadvertent large power surges in the logic circuit that might well be injurious thereto.

The typical operation of switch 74 lasts for several microseconds or even a millisecond. Switches with operating speeds in the picosecond range are readily available. Therefore, time multiplexing in the manner described is well within the state of the art with respect to switching components. Such components are subjected to extremely high pressures and temperatures in their downhole locations. However, since the operation is so fast with respect to the gate periods or the data subperiods described, a variance in their operating time does not distort or smear any of the data. The data itself are not digitized as a result of the switching operation, but are merely sampled in their analog condition and transmitted in that form. Thus, there are no data logic circuits downhole subjected to the extremes of temperature and pressure that exist there.

Finally, it should be noted that the sonde described in conjunction with FIG. 6 is of a standard construction and can be characterized as a module for use in an overall system. That is, one receiver sonde is quite interchangeable with any other receiver sonde. The only unique characteristic that one sonde has with respect to any other sonde is its preset address, as determined by reference 78 in FIG. 6. Once it is determined where in the vertical sequence of sondes a particular sonde is to be located, then this address switch 78 is preset to determine its window of operation. This is also true of hydrophones in a streamer cable when the invention is adapted to the marine environment. In the disclosed embodiments, the sonde which is located at the point on the transmission cable most removed from the point being transmitted to will have the largest number preset in counter 76 by switches 78. Each sonde successively closer to the point being transmitted to will have smaller preset addresses. So, in FIG. 1, receives 12 will have the largest address, which 14 will be smaller than 12, and 16 smaller than 14. The same relationship will be found in FIG. 9 for 12b, 14b, and 16b and in FIG. 10 for 12b, 14b and 16b.

FIGS. 8, 9 and 10 disclose alternative embodiments of the invention adapted for use with downhole digitizers, use in marine environments, and use with geophones distributed on the ground surface. Many of the disclosed features are identical or very similar to those already disclosed, and components performing like functions in like manner are designated by "primed" numbers. For instance, a receiver 12 in FIG. 1 performs a similar function to receiver 12a in FIG. 8 receiver 12b in FIG. 9 and receiver 12c in FIG. 10. Consequently, the previous discussion pertaining to the multiplexing of receiver 12 is applicable to its analogs.

FIG. 8 depicts an embodiment in which the downhole analog multiplexing is used in conjunction with downhole digitizing. The signals detected by the receivers 12a, 14a and 16a are time multiplexed in the borehole 10a and demultiplexed on the surface by the demultiplexing circuit 37a just as in the embodiment depicted in FIG. 1. The common clock 36a performs the same function and operates in the same manner as the common clock 36 in FIG. 1. The noticeable difference in this embodiment is that a downhole digitizer 5 is suspended from the support and signal transmission cable 20a between the receivers 12a, 14a and 16a and the surface. The time-multiplexed signal output by the receivers 12a, 14a, and 16a are input to the downhole digitizer 5 in the same manner as is well known in the industry for standard downhole digitizing for digitizing before transmission to the ground surface.

FIG. 9 illustrates an embodiment adapted for use in marine environments. Streamer cable 20b contains receivers 12b, 14b and 16b and is towed beneath the ocean surface 130 behind towing vessel 134. Whereas receivers 12, 14 and 16 are geophones, receivers 12b, 14b and 16b are hydrophones. Source 24a is shown suspended from towing vessel 134 for ease of illustration but is placed with respect to receivers 12b, 14b and 16b in accordance with surveying practices well known in the art. Source 24a generates a seismic signal 26a which is reflected by a reflecting geologic interface 28a beneath the seafloor 132. Signals 30a 32a, and 34a are detected by receivers 12b, 14b and 16b, respectively, and time multiplexed as in the embodiment in FIG. 1. The resultant multiplexed signal is then transmitted to the demultiplexing circuit 37b aboard towing vessel 134 via streamer cable 20b and then stored or transmitted to shore by processing means 136. This embodiment could alternatively store or transmit the multiplexed signal for subsequent demultiplexing once the multiplexed signal reaches shore. Common clock 36b provides timing and control the same as does common clock 36 in FIG. 1.

FIG. 10 discloses still another embodiment of the invention wherein the receivers are deployed on the surface during land-based exploration. Geophone receivers 12c, 14c and 16c, are surrounded on the ground surface 140 along signal transmission cable 20c in a predetermined pattern as is well known in the art for optimal detection of reflected signals. Source 24b generates signal 26b which is then reflected by reflecting geological formation 28b. The resulting signals 30b, 32b, and 34b are then detected by 12c, 14c, and 16c, respectively. The detected signals are then time-multiplexed by receivers 12c, 14c, and 16c as are the detected signals by receivers 12, 14, and 16 in FIG. 1 and transmitted via transmission cable 20c. The multiplexed signal is transmitted to demultiplexing circuit 37c aboard instrument truck 142. Once the signal is demultiplexed, optional processing means 136a performs further processing, or stores the data, and transmits it to another location. Common clock 36c also provides timing and control as does common clock 36 in FIG. 1.

Although the above discussion has assumed only a sequence of three sondes, the actual number of sondes is selected by the operator. Twenty sondes is a more typical number that might be selected.

It has also been assumed that the geophone located within the sonde produces only one signal. A sonde can include multiple geophones for selectively operating in three different orthogonal axes or a single geophone that produces three such signals. In such event, the sonde would operate so as to have three successive windows or data subperiods; one for each of the outputs. The result would be much like operating three successive sondes of a single output as described for FIG. 6.

While particular embodiments of the invention have been shown and the preferred embodiment and alternatives have been described, it will be understood that the invention is not limited thereto. Many other such modifications may be made, which will become apparent to those skilled in the art.

What is claimed is:

1. Apparatus for collecting seismic data, comprising at least one seismic source for generating one or more seismic pulses,
   a borehole support and transmission cable,
   a receiver means suspended form said cable for being lowered into a borehole,
   said receiver means including a plurality of receivers for receiving said seismic pulses at their relative positions in the borehole, each receiver generating an analog signal proportional thereto,
   clock controller means for supplying coordinated timing and reset pulses to each of said receivers, said timing and reset pulses synchronizing said receivers, each of said receivers including
     a switch connected to said cable, said switch transmitting the generated analog data from its respective one of said receivers when its respective receiver is enabled and otherwise transmitting generated analog data signals from other of said receivers and
     a counter connected to said switch and to said clock controller means, each reset pulse initiating operation of said counter for counting subsequent timing pulses and, following a predetermined number of timing pulses, enabling its respective one of said receivers to transmit on said cable its generated analog signal during a non-overlapping predetermined subperiod of time of transmission with the analog signals from the other of said receivers, thereby time multiplexing the signals from said receivers, and
   processing means including analog-to-digital converter means connected to said cable for subsequent data conversion and handling of the time multiplexed signals from said receivers.

2. An apparatus in accordance with claim 1 wherein a downhole digitizing means is suspended from said support and transmission cable between said receiver means and the ground surface.

3. Apparatus for collecting seismic data, comprising at least one seismic source for generating one or more seismic pulses,
   a streamer cable for towing and for the transmission of signals,
   receiver means in said cable including a plurality of receivers for receiving seismic pulses each receiver generating an analog signal proportional thereto,
   a clock controller means for supplying coordinated timing and reset pulses to each of said receivers, said timing and reset pulses synchronizing said receivers, each of said receivers including
     a switch connected to said cable, said switch transmitting the generated analog data from its respective one of said receivers when its respective receiver is enabled and otherwise transmitting generated analog data signals from other of said receivers, and
     a counter connected to said switch and to said clock controller means, each reset pulse initiating operation of said counter for counting subsequent timing pulses and, following a predetermined number of timing pulses, enabling its respective one of said receivers to transmit on said cable its generated analog signal during a non-overlapping predetermined subperiod of time of transmission with the analog signals from the other of said receivers, thereby time multiplexing the signals from said receivers, and
   processing means including analog-to-digital converter means connected to said cable for subsequent data conversion and handling of the time multiplexed signals from said receivers.

4. Apparatus for collecting seismic data, comprising at least one seismic source for generating oen or more seismic pulses,
   a transmission cable,
   receiver means connected to said transmission cable, said receiver means including a plurality of receivers distributed along said transmission cable for receiving said seismic pulses, each receiver gestating an analog signal proportional thereto,
   clock controller means for supplying coordinated timing and reset pulses to each of said receivers, said timing and reset pulses synchronizing said receivers and, each of said receivers including
     a switch connected to said cable, said switch transmitting the generated analog data from its respective one of said receivers when its respective receiver is enabled and otherwise transmitting generated analog data signals from other of said receivers, and
     a counter connected to said switch and to said clock controller means, each reset pulse initiating operation of said counter for counting subsequent timing pulses and, following a predetermined number of timing pulses, enabling its respective one of said receivers to transmit on said cable its generated analog signal during a non-overlapping predetermined subperiod of time of transmission with the analog signals from the other of said receivers, thereby time multiplexing the signals from said receivers, and
   processing means including analog-to-digital converter means connected to said cable for subsequent data conversion and handling of the time multiplexed signals from said receivers.

5. Apparatus in accordance with claim 1, 3 or 4 wherein each receiver means generates at least a second analog signal so that a first channel produces a first signal and a second channel produces a second signal, and wherein said previously named switch is connected to the first channel and includes a second switch connected to said second channel, said counter separately enabling said receiver first channel and said second channel at different subperiods of time.

6. Apparatus in accordance with claim 1, 3 or 4 wherein a reset pulse occurs a plurality of times during the period of receipt of each seismic pulse.

7. Apparatus in accordance with claim 1, 3 or 4 wherein the number of timing pulses counted by said respective counters of said receivers required for said respective counters to enable their respective receivers is small for the most removed of said receivers from the point being transmitted to and increasingly larger for successively closer positioned receivers.

8. Apparatus in accordance with claim 3 or 4 wherein each of said respective switches of said receivers is actuated by its said counter to disconnect the analog signal of the next most removed receiver from said cable when said counter enables its own receiver for cable transmission.

9. Apparatus in accordance with claim 1, or 4 wherein each of said receivers is of interchangeable modular construction.

10. Apparatus in accordance with claim 1, or 4 wherein said cable includes seven wires and the transmission of the analog signals from said receivers utilizes the same common pair of wires.

11. Apparatus in accordance with claim 10, wherein said timing pulses are transmitted on a third dedicated wire of said cable and said reset pulses are transmitted on a fourth dedicated wire of said cable.

12. Apparatus in accordance with claim 1 or 4, wherein said clock controller is located at the ground surface.

13. Apparatus in accordance with claim 3 wherein said clock controller means is located on a vessel towing said cable.

14. Apparatus in accordance with claim 1 or 3 wherein said processing means is located at the surface.

15. Apparatus in accordance with claim 3 wherein said processing means is located on a vessel towing said cable.

16. Apparatus for collecting seismic data following the external generation of one or more seismic pulses and for transmitting said seismic data in the form of analog signals on a transmission cable which suspends the apparatus in a borehole, for processing at another location, said apparatus comprising:

receiver means connected to the cable, said receiver means including a plurality of successfully spaced apart receivers for receiving said seismic pulses at their respective portions, each receiver having a borehole engaging means respectively associated with each of said receivers to acoustically couple said receivers to the borehole, and each of said receivers generating an analog signal proportional thereto, clock controller means for supplying coordinated timing and reset pulses to each of said receivers, said timing and reset pulses synchronizing said receivers, each of said receivers including a switch connected to said cable, said switch transmitting the generated analog data from its respective one of said receivers when its respective receiver is enabled and otherwise transmitting generated analog data signals from other of said receivers, a counter connected to said switch and to said clock controller means, each reset pulse initiating operation of said counter for counting subsequent timing pulses and, following a predetermined number of timing pulses, enabling a respective one of said receivers to transmit on said cable its generated analog signal during a non-overlapping predetermined subperiod of time of transmission with the analog signals from the other of said receivers, thereby time multiplexing the signals from said receivers, motor means for receiving motor control signals by way of the borehole support and transmission cable and respectively connected to each of said borehole engaging means for actuating said respective motor means to engage and disengage the borehole in response to the motor control signals, and battery means located downhole with said receivers and respectively associated with each of said motor means for providing necessary local power thereto.

17. Apparatus for collecting seismic data following the external generation of one or more seismic pulses and for transmitting said seismic data in the form of analog signals in a transmission cable which suspends the apparatus in a borehole for processing at another location said apparatus comprising:

receiver means connected to the cable, said receiver means including a plurality of successively spaced apart receivers for receiving said seismic pulses at their relative positions, each of the plurality of successively spaced apart receivers being located in a respective sonde, one located above another, and a borehole engaging means respectively associated with each of said successively spaced apart receivers, said borehole engaging means including a scissor jack extending from a respective one of said sondes, and each of said jacks including a threaded screw post having oppositely threaded screws at either end of said post, an upper and a lower arm pair, a first end of each arm of said pair respectively engaging said oppositely threaded screws on said post, said upper and lower arms meeting together at their second ends at a pivot, said motor means rotating said post in one direction to cause said arm pairs to advance said pivot toward the borehole wall and in the opposite direction to cause said arm pairs to retract said pivot from the borehole wall, and wherein each of the plurality of successively spaced apart receivers generate an analog signal proportional thereto, and clock controller means for supplying coordinated timing and reset pulses to each of said receivers, said timing and reset pulses synchronizing said receivers, each of said receivers including a switch connected to said cable, transmitting the generated analog data from its respective one of said receivers when its respective receiver is enabled and otherwise transmitting generated analog data signals from other of said receivers and a counter connected to said switch and to said clock controller means, each reset pulse initiating operation of said counter for counting subsequent timing pulses ad, following a predetermined number of timing pulses, enabling a respective one of said receivers to transmit on said cable its generated analog signal during a on-overlapping predetermined subperiod of time of transmission with the analog signals from the other said receivers, thereby time multiplexing the signals from said receivers.

18. Apparatus for collecting seismic data following the external generation of one or more seismic pulses and for transmitting said seismic data in the form of analog signals on a transmission cable, which suspends the apparatus in a borehole, for processing at another location, said apparatus comprising:

receiver means connected to the cable, said receiver means including a plurality of successively spaced apart receivers for receiving said seismic pulses at their relative positions, each of the plurality of successively spaced apart receivers is located in a respective sonde, one located above another, and each of the plurality of successively spaced apart receivers generates an analog signal proportional thereto, a borehole engaging means including a plurality of scissor jacks evenly spaced about a respective one of said sondes, and each of said jacks including a threaded screw post having oppositely threaded screws at either end of said post, a plurality of upper and lower arm pairs, a first end of each arm of said pair respectively engaging said oppositely threaded screws on said post, said upper and lower arms meeting together at their second ends at a pivot, said motor means rotating said post in one direction to cause said arm pairs to advance said pivot toward the borehole wall and in the opposite direction to cause said arm pairs to retract said pivot from the borehole wall, and clock controller means for supplying coordinated timing and reset pulses to each of said receivers, said timing and reset pulses synchronizing said receivers, each of said receivers including a switch connected to said cable, said switch transmitting the generated analog data from its respective one of said receivers when its respective receiver is enabled and otherwise transmitting generated analog data signals from other of said receivers and a counter connected to said switch and to said clock controller means, each reset pulse initiating operation of said counter for counting subsequent timing pulses and, following a predetermined number of timing pulses, enabling a respective one of said receivers to transmit on said cable its generated analog signal during a non-overlapping predetermined subperiod of time of transmission with the analog signals from the other of said receivers, thereby time multiplexing the signals from said receivers.

19. Apparatus for collecting seismic data following the external generation of one or more seismic pulses and transmitting said seismic data in the form of analog signals on a transmission cable for processing at another location, comprising:

receiver means connected to the cable, said receiver means including a plurality of successively spaced apart receivers for receiving said seismic pulses at their relative positions, each of said receivers generating an analog signal proportional thereto, clock controller means for supplying coordinated timing and reset pulses to each of said receivers, said timing and reset pulses synchronizing said receivers, each of said receivers including a switch connected to said cable, said switch transmitting the generated analog data from its respective one of said receivers when its respective receiver is enabled and otherwise transmitting generated analog data signals from other of said receivers and a counter connected to said switch and to said clock controller means, each reset pulse initiating operation of said counter for counting subsequent timing pulses and, following a predetermined number of timing pulses, enabling a respective one of said receivers to transmit on said cable its generated analog signal during a non-overlapping predetermined subperiod of time of transmission with the analog signals from the other of said receivers, thereby time multiplexing the signals from said receivers separate coupling means respectively associated with each of said successively vertically spaced receivers for respectively coupling said receivers to the borehole, coupling control means for activating said coupling means, and shaker means for simultaneously shaking the borehole support and transmission cable so as to cause each of said receivers to create and transmit an analog signal capable of uphole analysis for determining which of said receivers are properly coupled to the borehole.

20. Apparatus in accordance with claim 19, and including means for analyzing each of said analog signals by comparing therewith a predetermined signal indicative of proper coupling with the borehole.

21. Subcombination apparatus for collecting seismic data following the external generation of one or more seismic pulses and transmitting the data in the form of analog signals on a transmission cable for processing at another location, comprising receiver means connected to the cable, said receiver means including a plurality of successively spaced apart receivers for receiving said seismic pulses at their relative positions, each of said receivers generating an analog signal proportional thereto, clock controller means for supplying coordinated timing and reset pulses to each of said receivers, said timing and reset pulses synchronizing said receivers, each of aid receivers including a switch connected to said cable, said switch transmitting the generated analog data from its respective one of said receivers when its respective receiver is enabled and otherwise transmitting generated analog data signals from other of said receivers and a counter connected to said switch and to said clock controller means, each reset pulse initiating operation of said counter for counting subsequent timing pulses and, following a predetermined number of timing pulses, enabling a respective one of said receivers to transmit on said cable its generated analog signal during a non-overlapping predetermined subperiod of time of transmission with the analog signals from the other of said receivers, thereby time multiplexing the signals from said receivers.

22. Apparatus in accord with claim 21, wherein said receiver means is suspended from or contained in a hydrostreamer cable towed behind a towing vessel and transmits the analog signals to the towing vessel via the hydrostreamer cable.

23. Apparatus in accord with claim 21 wherein said plurality of receivers extend from the cable and are distributed along the surface in a predetermined pattern and said analog signals are transmitted for processing at a single location.

24. Apparatus in accordance with claim 21, wherein each receiver generates at least a second analog signal so that a first channel produces a first signal and a second channel produces a second signal, and wherein said previously named switch is connected to the first channel and including a second switch connected to said second channel, said counter separately enabling said receiver first channel and said second channel at different subperiods of time.

25. Apparatus in accordance with claim 21, wherein a reset pulse occurs a plurality of times during the period of receipt of each seismic pulse.

26. Apparatus in accordance with claim 21, wherein the number of timing pulses counted by said respective counters of said receivers required for said respective counters to enable their respective receivers is small for the most removed of said receivers and from the point being transmitted to increasingly larger for successively higher positioned receivers.

27. Apparatus in accordance with claim 26, wherein each of said respective switches of said receivers is actuated by its respective counter to disconnect the analog signal of the next most removed receiver from said counter and enable its own receiver for cable transmission.

28. Apparatus in accordance with claim 22, wherein each of said receivers is of interchangeable modular construction.

29. Apparatus in accordance with claim 22, wherein the transmission of the analog signals from said receivers utilizes the same common pair of wires.

30. Apparatus in accordance with claim 22, wherein said clock controller is located at the ground surface or on a towing vessel.

31. Apparatus for collecting seismic data, comprising
a seismic cable having a first channel and a second channel, and
a plurality of receivers distributed along said cable, each of said receivers transmitting data through said first channel during a predetermined, non-overlapping subperiod of a transmission period in response to timing and control signals transmitted through said second channel, said plurality of receivers being serially distributed,
each of said receivers when reset, ceasing transmission of data, and
beginning with the most remote receiver, each of said receivers being enabled by a separately predetermined higher number of count pulses from the timing and control signals for transmitting its own data during an assigned subperiod while therebefore passing through data from more remote of said receivers such that transmission of data serially commences and ceases from each of said receivers,
each of said receivers containing a counter for receiving the count pulses, and controlling transmission of data through said first channel from more remote receivers and then from the receiver containing said counter.

* * * * *